(12) United States Patent
Wang et al.

(10) Patent No.: US 8,726,265 B2
(45) Date of Patent: May 13, 2014

(54) APPARATUS AND METHOD FOR PACKING A SOFTWARE PACKAGE OF VERSION UPGRADE

(75) Inventors: Ning Wang, Shenzhen (CN); Xudong Jin, Shenzhen (CN); Xiao Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/259,159

(22) PCT Filed: Nov. 23, 2010

(86) PCT No.: PCT/CN2010/079005
§ 371 (c)(1),
(2), (4) Date: Feb. 11, 2013

(87) PCT Pub. No.: WO2012/019395
PCT Pub. Date: Feb. 16, 2012

(65) Prior Publication Data
US 2013/0132936 A1    May 23, 2013

(30) Foreign Application Priority Data
Aug. 11, 2010 (CN) .......................... 2010 1 0251685

(51) Int. Cl.
*G06F 9/44* (2006.01)
(52) U.S. Cl.
USPC .......................................................... 717/170
(58) Field of Classification Search
CPC ........................................................ G06F 8/65
USPC .......................................................... 717/170
See application file for complete search history.

(56) References Cited

U.S. PATENT DOCUMENTS 6,063,134 A * 5/2000 Peters et al. .................. 717/176
7,480,907 B1 * 1/2009 Marolia et al. ............... 717/174
(Continued)

FOREIGN PATENT DOCUMENTS

CN    101217363 A    7/2008
CN    101436141 A    5/2009
(Continued)

OTHER PUBLICATIONS

Notification Concerning Transmittal of the International Search Report and the Written Opinion of the International Searching Authority for PCT/CN2010/079005, including (1) International Search Report and (2) Written Opinion, mailed May 19, 2011 (11 pages).

(Continued)

*Primary Examiner* — Philip Wang
(74) *Attorney, Agent, or Firm* — Clark & Elbing LLP (57) ABSTRACT

The present invention discloses a method and an apparatus for packing a version upgrade software package. The method comprises: acquiring version upgrade software for upgrading a mobile terminal; encrypting the version upgrade software; generating version upgrade software information corresponding to the encrypted version upgrade software, wherein the version upgrade software information comprises a decryption flag, and the decryption flag is configured to indicate that the encrypted version upgrade software is decrypted within the version upgrade software package during process of upgrading mobile terminal; and packing to obtain the version upgrade software package of the mobile terminal, wherein the version upgrade software package comprises the encrypted version upgrade software, the version upgrade software information and a self-triggered unpacking program, and the self-triggered unpacking program is configured to start the version upgrade software and the version upgrade software information to upgrade the mobile terminal.

18 Claims, 6 Drawing Sheets

(56) References Cited

U.S. PATENT DOCUMENTS

| | | | |
|---|---|---|---|
| 2004/0194081 A1* | 9/2004 | Qumei et al. | 717/173 |
| 2005/0278716 A1 | 12/2005 | Koppen et al. | |
| 2006/0004883 A1 | 1/2006 | Chou et al. | |
| 2007/0169099 A1* | 7/2007 | Rao et al. | 717/168 |
| 2009/0260003 A1* | 10/2009 | Matsugashita | 717/174 |
| 2010/0169672 A1 | 7/2010 | Takeda | |
| 2011/0219241 A1 | 9/2011 | Takeda | |

FOREIGN PATENT DOCUMENTS

| | | | |
|---|---|---|---|
| CN | 101561762 A | 10/2009 | |
| EP | 0864969 A1 | 9/1998 | |
| EP | 2109057 A2 | 10/2009 | |

OTHER PUBLICATIONS

Extended European Search Report for European Patent Application No. 10855816.4, dated Oct. 30, 2013 (7 pages).

Written Opinion of the International Searching Authority for International Application No. PCT/CN2010/079005, dated May 19, 2011 (4 pages).

International Search Report for International Application No. PCT/CN2010/079005, mailed May 19, 2011 (4 pages).

International Preliminary Report on Patentability for International Application No. PCT/CN2010/079005, issued Feb. 12, 2013 (5 pages).

* cited by examiner

APPARATUS AND METHOD FOR PACKING A SOFTWARE PACKAGE OF VERSION UPGRADE

CROSS-REFERENCE TO RELATED APPLICATIONS

This application is the U.S. National Stage filed under 35 U.S.C. §371 of International Application No. PCT/CN2010/079005, filed Nov. 23, 2010, which claims the benefit of Chinese Patent Application No. 201010251685.9, filed Aug. 11, 2010.

FIELD OF THE INVENTION

The present invention relates to the communication field, and in particular to a method and an apparatus for packing a version upgrade software package.

BACKGROUND OF THE INVENTION

With the development of the mobile communication technology, functions of a mobile terminal become increasingly complex. In order to extend the functions of the mobile terminal or solve the compatibility problems of the mobile terminal, the software of the mobile terminal needs to be upgraded.

Previously, the method for upgrading the mobile terminal software is mainly that the users send the mobile terminal to an after-sale service center designated by the mobile terminal manufacturer, and the professional technician of the after-sale service center writes a file of new version into the mobile terminal equipment by the mobile terminal upgrade tool. This upgrading method requires the users to have certain professional knowledge. Because the users must go to the after-sale service center for each upgrade, the ordinary users cannot learn and use the latest service in time, and the cost for the after-sale service is high.

In recent years, the users and the custom operators propose a new requirement for the mobile terminal manufacturer that it is desirable to provide a version upgrade tool suitable for the mobile terminal users to operate. When issuing a new version, the latest upgrade software is placed on the website designated by the mobile terminal manufacturer. The users download it and the mobile terminal is upgraded by users themselves. Therefore, aiming at packing the version upgrade software package of the mobile terminal, such a method is provided in the relevant art that all the required files are merged after being collected, and then all the files are decompressed to the install directory designated by the users to install when installing by the users.

However, this packing method requires the users to decompress and install, it is impossible that the users all have professional operation knowledge, and the increased operation complexity is inconvenient for the users. Meanwhile, the version file is directly exposed to the users by this packing method. Hence, it is very easy to acquire the version file in the install directory for certain users who have high professional operation knowledge, thus reducing the software security.

SUMMARY OF THE INVENTION

There are problems existing in the relevant art that after packing a version upgrade software package of a mobile terminal, the security level of the version upgrade software package is not high and the operations of decompressing and installing by the users are complex. The present invention provides a method and an apparatus for packing a version upgrade software package, which can solve the above problems.

A method for packing a version upgrade software package is provided according to one aspect of the present invention.

The method for packing a version upgrade software package according to the present invention comprises: acquiring version upgrade software for upgrading a mobile terminal; encrypting the version upgrade software; generating version upgrade software information corresponding to the encrypted version upgrade software, wherein the version upgrade software information comprises a decryption flag, and the decryption flag is configured to indicate that the encrypted version upgrade software is decrypted within the version upgrade software package during a process of upgrading the mobile terminal; and packing to obtain the version upgrade software package of the mobile terminal, wherein the version upgrade software package comprises the encrypted version upgrade software, the version upgrade software information and a self-triggered unpacking program, and the self-triggered unpacking program is configured to start the version upgrade software and the version upgrade software information to upgrade the mobile terminal.

Further, before packing to obtain the version upgrade software package of the mobile terminal, the above method further comprises: generating a configuration file according to the version upgrade software, wherein the configuration file comprises a version number of the version upgrade software package; and generating configuration file information according to the configuration file, wherein the configuration file information comprises a size of the configuration file.

Further, the version upgrade software package further comprises the configuration file and the configuration file information; and the self-triggered unpacking program is further configured to determine whether version number information contained in a name of the version upgrade software package is modified according to the configuration file and the configuration file information, and if result of the determination is yes, to prompt that version information is wrong.

Further, the version upgrade software comprises a version file and a download file; and generating the version upgrade software information corresponding to the encrypted version upgrade software comprises: generating version file information corresponding to an encrypted version file, wherein the version file information comprises the decryption flag, and the decryption flag is configured to indicate that the encrypted version file is decrypted within the version upgrade software package during the process of upgrading the mobile terminal; and generating download file information corresponding to the download file, wherein the download file information comprises a release flag, configured to indicate that the download file is saved in a hidden directory of a local computer during a process that the local computer upgrades the mobile terminal.

Further, the self-triggered unpacking program is further configured to save the download file in the hidden directory of the local computer according to the release flag in the download file information during the process that the local computer upgrades the mobile terminal; and the download file is configured to upgrade the mobile terminal by using the version file and the version file information.

Further, the version upgrade software information further comprises: a name of the version upgrade software, a size of the version upgrade software and a relative path of the version upgrade software.

Further, the version upgrade software package further comprise a trailer file, and the trailer file comprises a size of the self-triggered unpacking program, a number of the version upgrade software and constant information configured to locate the trailer file.

An apparatus for packing a version upgrade software package is provided according to another aspect of the present invention.

The apparatus for packing a version upgrade software package according to the present invention comprises: a first acquisition module, configured to acquire version upgrade software for upgrading a mobile terminal; a first encryption module, configured to encrypt the version upgrade software; a first generating module, configured to generate version upgrade software information corresponding to the encrypted version upgrade software, wherein the version upgrade software information comprises a decryption flag, and the decryption flag is configured to indicate that the encrypted version upgrade software is decrypted within the version upgrade software package during a process of upgrading the mobile terminal; and a packing module, configured to pack to obtain the version upgrade software package of the mobile terminal, wherein the version upgrade software package comprises the encrypted version upgrade software, the version upgrade software information and a self-triggered unpacking program, and the self-triggered unpacking program is configured to start the version upgrade software and the version upgrade software information to upgrade the mobile terminal.

Further, the above apparatus for packing a version upgrade software package further comprises: a second generating module, configured to generate a configuration file according to the version upgrade software, wherein the configuration file comprises a version number of the version upgrade software package; and a third generating module, configured to generate configuration file information according to the configuration file, wherein the configuration file information comprises a size of the configuration file; and the version upgrade software package further comprises the configuration file and the configuration file information; and the self-triggered unpacking program is further configured to determine whether version number information contained in the name of the version upgrade software package is modified according to the configuration file and the configuration file information, and if the result of the determination is yes, to prompt that the version information is wrong.

Further, the version upgrade software comprises a version file and a download file; and the first generating module comprises: a first generating sub-module, configured to generate version file information corresponding to an encrypted version file, wherein the version file information comprises the decryption flag, and the decryption flag is configured to indicate that the encrypted version file is decrypted within the version upgrade software package during the process of upgrading the mobile terminal; and a second generating sub-module, configured to generate download file information corresponding to the download file, wherein the download file information comprises a release flag, configured to indicate that the download file is saved in a hidden directory of a local computer during a process that the local computer upgrades the mobile terminal; and the self-triggered unpacking program is further configured to save the download file in the hidden directory of the local computer during the process that the local computer upgrades the mobile terminal according to the release flag in the download file information; and the download file is configured to upgrade the mobile terminal by using the version file and the version file information.

The present invention solves the problems in the relevant art that after packing a version upgrade software package of a mobile terminal, the security level of the version upgrade software package is not high and the operations of decompressing and installing by the users are complex. The present invention achieves high security level and easy-to-use of the version upgrade software package.

BRIEF DESCRIPTION OF THE DRAWINGS

The drawings illustrated herein provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

It should be noted that the embodiments and the features of the embodiments in the present application can be combined with each other if there is no conflict. The present invention is described in detail hereinafter with reference to the drawings and in combination with the embodiments.

Figure 1:
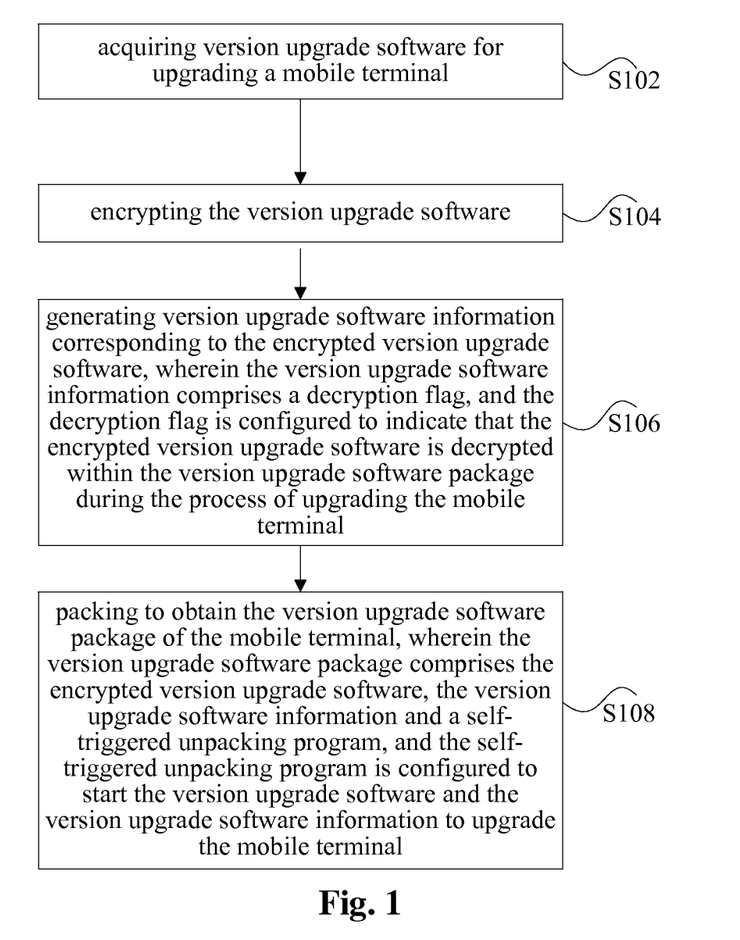
FIG. 1 is a flowchart of a method for packing a version upgrade software package according to an embodiment of the present invention.

A method for packing a version upgrade software package is provided according to an embodiment of the present invention. FIG. 1 is a flowchart of a method for packing a version upgrade software package according to an embodiment of the present invention, which comprises step S102 to step S108 as follows.

Step S102, acquire a version upgrade software for upgrading a mobile terminal.

Step S104, encrypt the version upgrade software.

Step S106, generate version upgrade software information corresponding to the encrypted version upgrade software, wherein the version upgrade software information comprises a decryption flag, and the decryption flag is configured to indicate that the encrypted version upgrade software is decrypted within the version upgrade software package during the process of upgrading the mobile terminal.

Step S108, pack to obtain the version upgrade software package of the mobile terminal, wherein the version upgrade software package comprises the encrypted version upgrade software, the version upgrade software information and a self-triggered unpacking program, and the self-triggered unpacking program is configured to start the version upgrade software and the version upgrade software information to upgrade the mobile terminal.

In the relevant art, after packing a version upgrade software package of a mobile terminal, the security level of the version upgrade software package is not high and the operations of decompressing and installing by the users are complex. In the embodiment of the present invention, the version upgrade software is a core program for upgrading the mobile terminal equipment and cannot be revealed to the users. Therefore the version upgrade software is decrypted only within the version upgrade software package during the process of upgrading the mobile terminal. Then, the decrypted version upgrade software is started and the relevant files thereof are written into the mobile terminal to be upgraded. This solution can prevent certain users from acquiring the version upgrade software, thereby improving the security of the version upgrade software package. Meanwhile, the self-triggered unpacking program can achieve the automatic upgrade of the mobile terminal software, thereby simplifying the user's operation.

Preferably, before the version upgrade software package of the mobile terminal is obtained by packing, a configuration file is generated according to the version upgrade software, wherein the configuration file comprises a version number of the version upgrade software package. And, configuration file information is generated according to the configuration file, wherein the configuration file information comprises the size of the configuration file.

In the present preferred embodiment, the configuration file comprises the version number of the version upgrade software package. The version number can be used to determine whether the version of the version upgrade software package is correct. Meanwhile, configuration file information comprises the size of the configuration file, so that the position and size of the file can be located and determined when reading the configuration file.

Preferably, the version upgrade software package further comprises the configuration file and the configuration file information. And the self-triggered unpacking program is further configured to determine whether version number information contained in the name of the version upgrade software package is modified according to the configuration file and the configuration file information, and if the result of the determination is yes, then to prompt that the version information is wrong.

In the present preferred embodiment, the self-triggered unpacking program reads the version number of the version upgrade software package in the configuration file, and compares it with the version number information contained in the name of the version upgrade software package. If the comparison result is that the two are inconsistent, it is deemed that the version number in the name of the version upgrade software package is modified and the version of the version upgrade software package is incorrect. Then, it is prompted that the version information is wrong. In this way, it can be prevented that the version upgraded by the user is not a desired version due to the modification of the version number in the name of the version upgrade software package, thereby improving the user's experience.

Preferably, the version upgrade software comprises a version file and a download file. And, generating version upgrade software information corresponding to the encrypted version upgrade software comprises: generating version file information corresponding to the encrypted version file, wherein the version file information comprises the decryption flag, and the decryption flag is configured to indicate that the encrypted version file is decrypted within the version upgrade software package during the process of upgrading the mobile terminal; and generating download file information corresponding to the download file, wherein the download file information comprises a release flag, configured to indicate that the download file is saved in a hidden directory of a local computer during the process that the local computer upgrades the mobile terminal.

In the present preferred embodiment, the version file in the version upgrade software absolutely cannot be revealed to the users. Therefore the version file is decrypted only within the version upgrade software package during the process of upgrading the mobile terminal. Then the download file writes the decrypted version file into the mobile terminal to be upgraded. This solution can prevent certain users from acquiring the version file. Meanwhile, the download file in the version upgrade software comprises a main program and a plurality of auxiliary programs. The version upgrade of the mobile terminal equipment can be achieved by the collaborative work of these programs.

Preferably, the self-triggered unpacking program is further configured to save the download file in the hidden directory of the local computer according to the release flag in the download file information during the process that the local computer upgrades the mobile terminal. And, the download file is configured to upgrade the mobile terminal by using the version file and the version file information.

In the present preferred embodiment, the self-triggered unpacking program saves the download file in the hidden directory of the local computer, and deletes the hidden directory and the download file together after the version upgrade software is completed. This solution can prevent certain users who have high professional operation knowledge from easily acquiring the file in the non hidden install directory, thereby improving the security of the software.

Meanwhile, the present preferred embodiment avoids decrypting the download file within the version upgrade software package. The download file, which is decrypted within the version upgrade software package, usually is saved in the memory of the local computer. The large amount of memory footprint may slow down the running of the local computer, and thus affect the version upgrade of the mobile terminal. Therefore the present preferred embodiment can reduce the influence on the version upgrade of the mobile terminal.

Preferably, a version file information table is created in the hidden directory, and the version file information table is encrypted. The version file information table records the path and name of the version upgrade software package, and the name, the size and the offset position relative to the version upgrade software package of each version file.

In the present preferred embodiment, the encrypted version file information table is located in the hidden directory. This solution can prevent certain users who have high professional operation knowledge from easily acquiring the version file information table in the non hidden install directory. Meanwhile, even if certain users who have high professional operation knowledge have acquired the version file information table, because the version file information table only records the name, the size and the offset position of each version file and each of the version files is encrypted, it further prevents the users from acquiring the version file. Thereby, the security of the software is further improved.

Preferably, the version upgrade software information further comprises: the name of the version upgrade software, the size of the version upgrade software and the relative path of the version upgrade software.

The situation that a plurality of version upgrade software is included in the version upgrade software package is described in the present preferred embodiment. During the process of upgrading the version of the mobile terminal, for some versions to be upgraded, only one version upgrade software is required. For other versions to be ungraded, a plurality of version upgrade software may be required. In the present preferred embodiment, the names of the version upgrade software, the sizes of the version upgrade software and the relative paths of the version upgrade software are included in the version upgrade software information. This solution can guarantee that the self-triggered unpacking program can auto-locate the plurality of version upgrade software by the version upgrade software information, and guarantee that all of the relevant files are written into the mobile terminal correctly. Then, the upgrade of software version can be carried out correctly.

Preferably, the version upgrade software package further comprise a trailer file, and the trailer file comprises the size of the self-triggered unpacking program, the number of the version upgrade software and constant information configured to locate the trailer file.

In the present preferred embodiment, the trailer file can be decompressed first during the process of the decompression. Whether the version upgrade software package is correct is determined by determining whether the constant information in the trailer file is correct. When the constant information is correct, because the trailer file comprises the size of the self-triggered unpacking program, the self-triggered unpacking program can find the configuration file information merely by moving backwards the bytes of the size of the self-triggered unpacking program from the initial place of the version upgrade software package. Then, the configuration file, the version upgrade software information and the version upgrade software can be acquired in turn by the contents in the configuration file information. Thereby, the upgrade of software version can be carried out correctly.

In addition, considering that the above version upgrade software comprises the version file and the download file, the sequence of files in the version upgrade software package obtained by the method for packing according to the present preferred embodiment can be: the self-triggered unpacking program, the configuration file information, the configuration file, the download file information, the download file, the version file information, the version file and the trailer file. After the self-triggered unpacking program finds the configuration file information by moving backwards the bytes of the size of the self-triggered unpacking program from the initial place of the version upgrade software package, it can acquire in turn the configuration file, the download file information, the download file, the version file information and the version file by the contents in the configuration file information. Thereby, the upgrade of software version can be carried out correctly.

Therefore, the method for packing according to the above preferred embodiment achieves the determination of the correctness and the integrity of the version upgrade software package and achieves the accurate positioning for each upgrade file. Moreover, the implementation of this solution is simple and efficient.

Compared with the related art, the system and method for packing provided by the present invention can guarantee that the version file is not exposed directly to the users and the software operation is convenient. The version upgrade can be achieved by directly running the version upgrade software package without installing and configuring. This solution can fully meet the requirements for the security and the operational simplicity of the user level software version upgrade of the mobile terminal.

The present invention further provides a preferred embodiment which combines the technical solutions of the above plurality of preferred embodiments. This preferred embodiment is described in detail hereinafter.

Figure 2:
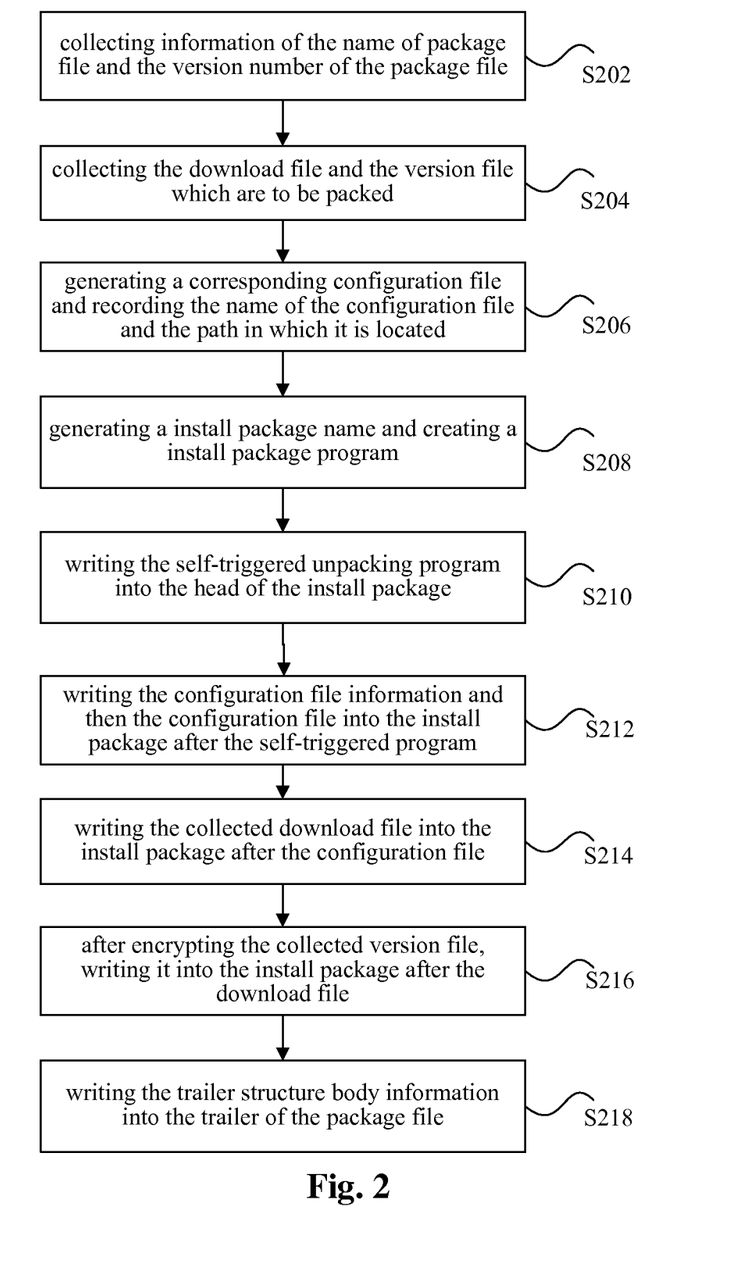
FIG. 2 is a flowchart of a method for packing a version upgrade software package according to a preferred embodiment of the present invention.

FIG. 2 is a flowchart of a method for packing a version upgrade software package according to a preferred embodiment of the present invention, which comprises step S202 to step S218 as follows.

Step S202, collect information of the name of a package file (such as the mobile terminal model) and a version number of the package file set by the users to generate the package file name.

Step S204, collect, group by group, relevant information (including the file name, the path and the file type etc.) about the download file and the version file which are to be packed, wherein the record of the file type herein is configured to indicate whether the file needs to be released to the local in the following steps. The download file needs to be released to the local and the version file does not.

Step S206, generate a configuration file according to the information collected by the previous two steps, and recording the name of the currently generated configuration file and the path in which it is located. The contents of the configuration file comprise the information about the version information of the package software, the name of the download file, the path relative to the self-triggered unpacking program of the download file etc.

Step S208, create an install package program in the preset directory, wherein the name of the install package is generated based on the information collected in step S202 according to certain rules.

Step S210, write the self-triggered unpacking program into the head of the install package.

Step S212, write the configuration file information and then the configuration file into the install package, immediately after the self-triggered program, wherein the configuration file information mainly records the size of the configuration file, so as to locate the position and size of the file when reading the configuration file.

Step S214, write the collected download file information and then the download file into the install package after the configuration file, wherein the download file information comprises the name, the size, the relative path and the flag of releasing to the local of the corresponding download file.

Step S216, after encrypt the collected version file, write the version file information and then the encrypted version file into the install package after the download file, wherein the version file information comprises the name, the size, the relative path and the flag of not releasing to the local of the corresponding encrypted version file.

Step S218, write the trailer structure body information into the trailer of the package file, wherein the trailer structure body information mainly comprises the file size of the self-triggered unpacking program, the total number of the download files and the version files and a piece of constant information for locating the trailer structure body itself.

The present invention is directed to the requirements that during the process of packing the version upgrade software package, certain special files do not need to be modified and only have the read operation, and this type of files are relatively more important and not suitable for direct revelation. Therefore, this type of files is attached to the back of other files when packing and is not released to the local when unpacking. Only the path, the name of the package software in which this type of files is located and the names, the sizes and the relative position offsets corresponding to this type of files are recorded. Hence, other programs can read this type of files directly from the package software, avoiding releasing this type of files to the local. Thus, the security of this type of files is guaranteed. It needs to be noted that all the practical applications that adopt the packing method of not-releasingto-the-local according to the present invention to pack important files which do not need modifying are within the scope of the present invention.

Figure 3:
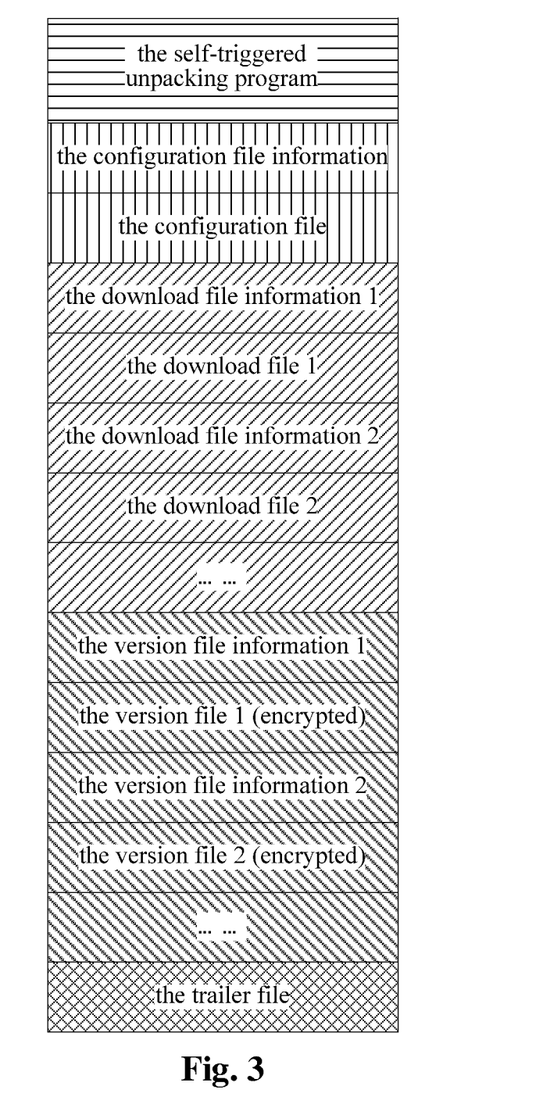
FIG. 3 is an internal structural diagram of a packed version upgrade software package according to a preferred embodiment of the present invention.

FIG. 3 is an internal structural diagram of a packed version upgrade software package according to a preferred embodiment of the present invention. As shown in FIG. 3, the sequence of each file in the version upgrade software package which is obtained by the method according to step S202 to step S218 can be: the self-triggered unpacking program, the configuration file information, the configuration file, the download file information, the download file, the version file information, the version file and the trailer file.

In order to better describe the present invention and embody the high security level and easy-to-use of the version upgrade software package in the present invention, the method of unpacking and self-triggering of the unpacking self-triggered module is described in detail in combination with FIG. 4 hereinafter.

Figure 4:
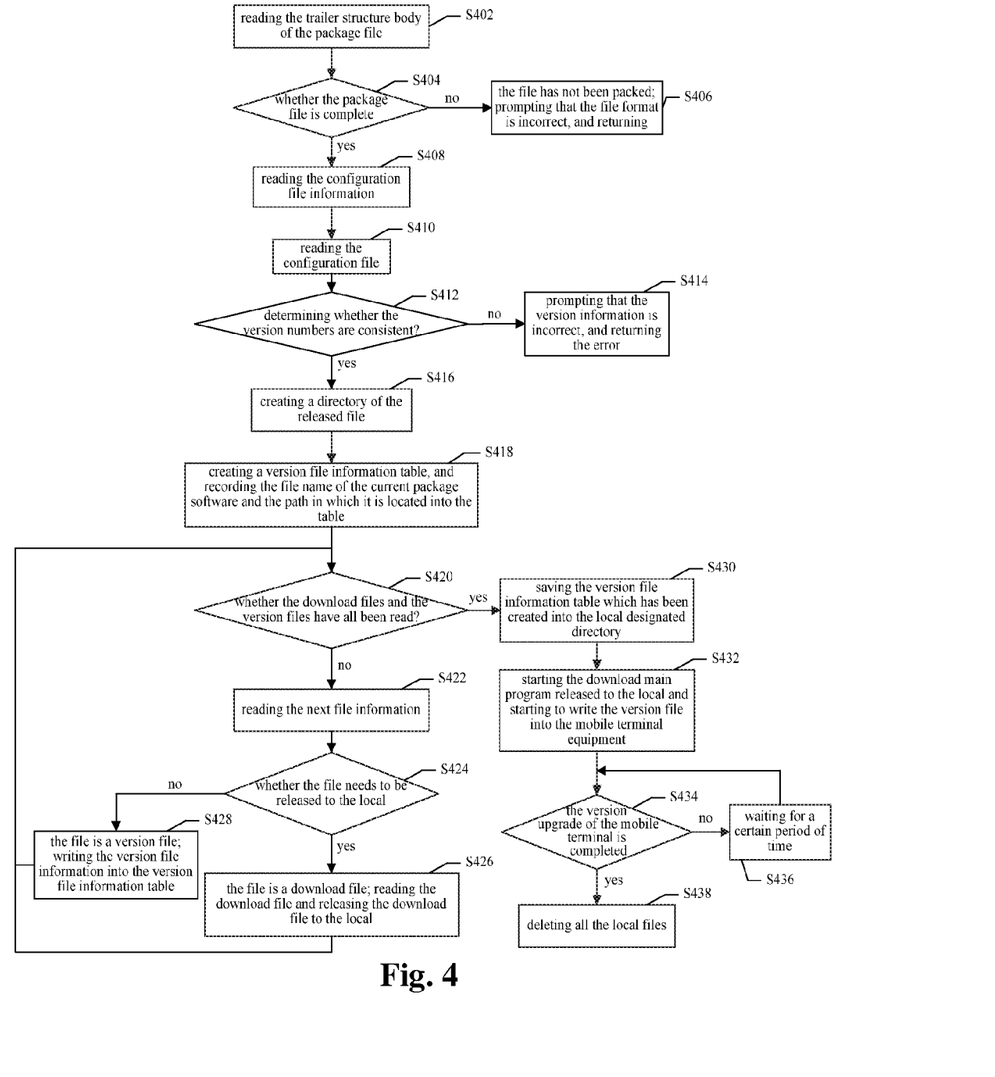
FIG. 4 is a flowchart of starting an unpacking self-triggered module according to a preferred embodiment of the present invention.

FIG. 4 is a flowchart of starting an unpacking self-triggered module according to a preferred embodiment of the present invention. As shown in FIG. 4, the flow comprises the process for unpacking the software and the process for self-triggering the download program or self-triggering the upgrade program. After the software which has been packed is started, the self-triggered unpacking program is triggered immediately to run, which comprises the following step S402 to step S438.

Step S402, read the trailer structure body information of the currently running package software to acquire the size of the self-triggered unpacking program, the total number of the download files and the version files and the constant information for locating the trailer structure body in the package file.

Step S404, determine, according to the information read in step S402, whether the trailer structure body information is complete and correct (mainly determine whether the read constant information for locating the trailer structure body is correct). If the relevant information is incorrect, it is determined that the package file is incomplete, and then step S406 is executed. If the relevant information is completely consistent, it is determined that the package file is complete, and then step S408 is executed.

Step S406: determine that the file has not been packed since the package file is incomplete, prompt the user that the file format is incorrect and return an error.

Step S408: start to read the configuration file information since the package file is complete. Because the file is attached after the self-triggered unpacking program, the configuration file information can be found by moving backwards the bytes of the corresponding size of the self-triggered unpacking program from the initial position of the package file. Relevant information is read and the size of the configuration file is acquired.

Step S410: read backwards the corresponding bytes according to the acquired size of the configuration file. The read content is the configuration file, and the version number of current package software can be acquired in the configuration file.

Step S412: compare the version number read in the step S410 with the version number in the software name, and determine whether they are consistent. If they are inconsistent, it is determined that the version number in the software name is modified, and the software description is incorrect, and then step S414 is executed. Otherwise, step S416 is executed.

Step S414: since the version number of the internal record and the version number which is described by the software itself are inconsistent, prompt the user that the version information which is currently used has an error and return the error. This step mainly prevents that the version number in the software name is modified, and that the version that the user tries to upgrade is not a desired version.

Step S416: create a hidden directory in a certain designated drive letter of the local (such as C:\ad7df9gh52), for releasing the download file to the directory later.

Step S418: create a version file information table, and record the file name of the current package software and the path in which it is located into the table.

Step S420: start to read the download file and the version file. Because the total number of the download files and the version files has been recorded in the trailer structure body information, it can be determined whether they have all been read by way of the count accumulation (the count number reaches the total number of the files). If the files have not all been read, then step S422 is executed, otherwise, step S430 is executed.

Step S422: read the next file information by recording the position of a previous file, wherein the file information comprises the file name, the relative path, the file size and whether the file needs to be released to the local.

Step S424: determine whether the file is a download file or a version file according to the description entry (whether the file needs to be released to the local) in the file information read in step S422. If it needs to be released to the local, then it is a download file and step S426 is executed. Otherwise, it is a version file and step S428 is executed.

Step S426: determine that it is a download file, read the download file according to the file length information, and release the file to the corresponding local directory according to the file path and the file name, with the relative path being consistent with the relative path of the file before packing. Step S420 is executed next.

Step S428: determine that it is a version file, and write the relevant information of the version file into the version file information table, wherein the information mainly comprises: the file name, the file size and the offset of the file relative to the initial position of the package file. The information mainly facilitates searching for and reading the version file from the package file later. Step S420 is executed next.

Step S430: if it is determined that the download files and the version files have all been read in step S420, the version file information table which is created in the previous step is saved into the local hidden directory.

Step S432: the self-triggered unpacking program starts the download main program released to the local to carry out the operation of writing the version file into the mobile terminal equipment. In this process, the download program acquires the path and the name of the currently running package software and the name, the offset position and the size of the encrypted version file in the package software by reading the package file information and the version file information recorded in the version file information table. Then, the download program searches for and reads the corresponding encrypted version file in the current package file, decrypts the version file and writes the decrypted version file into the mobile terminal equipment.

Step S434: in the upgrading process (namely the process of writing the version file into the mobile terminal), the self-triggered unpacking program also always monitors whether the upgrading process is completed. If it is not completed, then step S436 is executed. If it is completed, step S438 is executed.

Step S436: when the upgrade is not completed, wait for a certain period of time, such as half a second, and execute step S434 again to monitor, and cycle like this till the entire upgrading process is completed.

Step S438: when the upgrade is completed, delete all of the files released to the local, including the hidden directory created before. The entire upgrading process ends.

It needs to be noted that the steps shown in the flowchart of the drawings can be executed in, for example, a computer system with a group of computer executable instructions. Moreover, although the logical order is shown in the flowchart, in some cases, the steps shown or described can be carried out in a different order.

Figure 5:
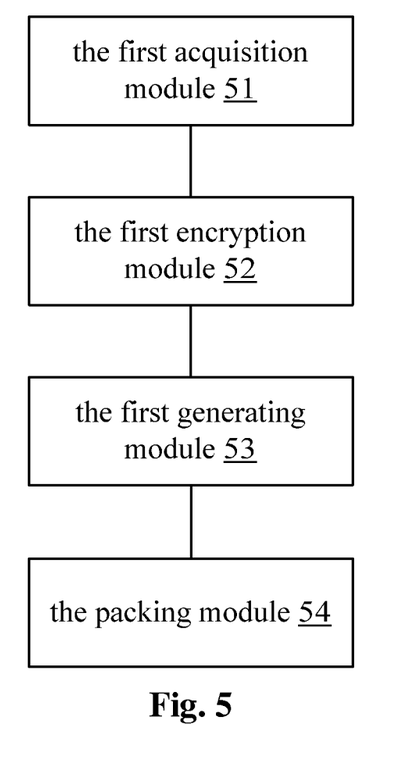
FIG. 5 is a structural block diagram of an apparatus for packing a version upgrade software package according to an embodiment of the present invention.

An embodiment of the present invention provides an apparatus for packing a version upgrade software package. The apparatus can be used to achieve the above method for packing the version upgrade software package. FIG. 5 is a structural block diagram of an apparatus for packing a version upgrade software package according to an embodiment of the present invention, which comprises a first acquisition module 51, a first encryption module 52, a first generating module 53 and a packing module 54. The structure of these modules is described in detail hereinafter.

The first acquisition module 51 is configured to acquire version upgrade software for upgrading a mobile terminal. The first encryption module 52 is connected to the first acquisition module 51 and is configured to encrypt the version upgrade software acquired by the first acquisition module 51. The first generating module 53 is connected to the first encryption module 52 and is configured to generate version upgrade software information corresponding to the version upgrade software encrypted by the first encryption module 52, wherein the version upgrade software information comprises a decryption flag, and the decryption flag is configured to indicate that the encrypted version upgrade software is decrypted within the version upgrade software package of the mobile terminal during the process of upgrading the mobile terminal. The packing module 54 is connected to the first encryption module 52 and the first generating module 53, and is configured to pack to obtain the version upgrade software package of the mobile terminal, wherein the version upgrade software package comprises the version upgrade software encrypted by the first encryption module 52, the version upgrade software information generated by the first generating module 53 and a self-triggered unpacking program, and the self-triggered unpacking program is configured to start the version upgrade software and the version upgrade software information to upgrade the mobile terminal.

In the relevant art, after packing a version upgrade software package of a mobile terminal, the security level of the version upgrade software package is not high and the operations of decompressing and installing by the users are complex. In the embodiment of the present invention, the version upgrade software is a core program for upgrading the mobile terminal equipment and cannot be revealed to the users. Therefore the version upgrade software is decrypted only in the version upgrade software package during the process of upgrading the mobile terminal. Then the decrypted version upgrade software is started and the relevant files are written into the mobile terminal to be upgraded. This solution can prevent certain users from acquiring the version upgrade software, thereby improving the security of the version upgrade software package. Meanwhile, the self-triggered unpacking program can achieve the automatic upgrade of the mobile terminal software, thereby simplifying the user's operation.

Figure 6:
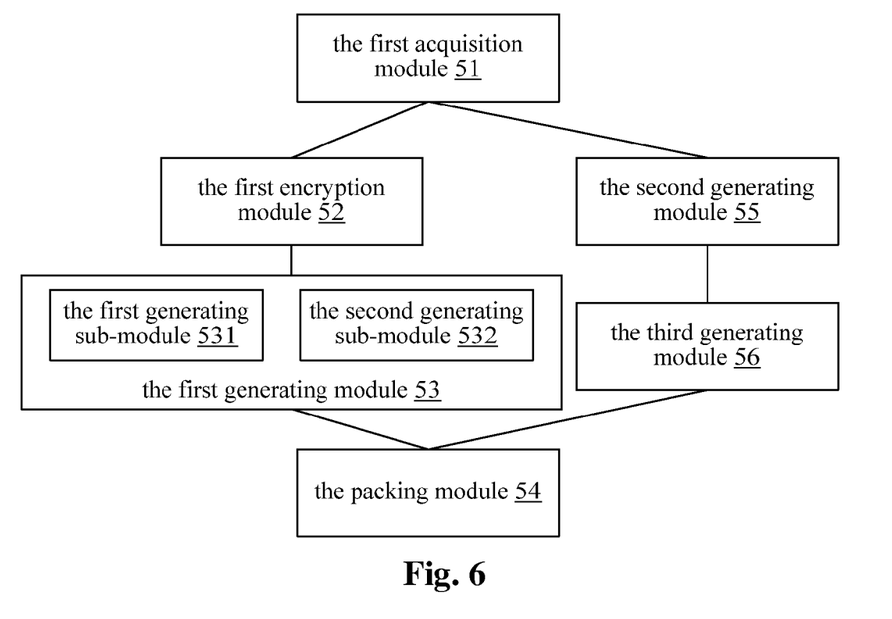
FIG. 6 is a structural block diagram of an apparatus for packing a version upgrade software package according to a preferred embodiment of the present invention.

Preferably, the above apparatus for packing the version upgrade software package further comprises a second generating module 55 and a third generating module 56. FIG. 6 is a structural block diagram of an apparatus for packing a version upgrade software package according to a preferred embodiment of the present invention, and the structure thereof is described in detail hereinafter.

The second generating module 55 is connected to the first acquisition module 51 and is configured to generate a configuration file according to the version upgrade software acquired by the first acquisition module 51, wherein the configuration file comprises a version number of the version upgrade software package. The third generating module 56 is connected to the second generating module 55 and is configured to generate configuration file information according to the configuration file generated by the second generating module 55, wherein the configuration file information comprises the size of the configuration file. The version upgrade software package further comprises the configuration file and the configuration file information. The self-triggered unpacking program is further configured to determine whether the version number information contained in the name of the version upgrade software package is modified according to the configuration file and the configuration file information, and if the result of the determination is yes, then to prompt that the version information is wrong.

In the present preferred embodiment, the configuration file comprises the version number of the version upgrade software package. The version number can be used to determine whether the version of the version upgrade software package is correct. Specifically, the self-triggered unpacking program reads the version number of the version upgrade software package in the configuration file, and compares it with the version number information contained in the name of the version upgrade software package. If the comparison result is that the two are inconsistent, it is determined that the version number in the name of the version upgrade software package is modified and the version of the version upgrade software package is incorrect. Then, it is prompted that the version information is wrong. In this way, it can be prevented that the version upgraded by the user is not a desired version due to the modification of the version number in the name of the version upgrade software package, thereby improving the user's experience. Meanwhile, the configuration file information comprises the size of the configuration file, so as to locate the position and size of the file when reading the configuration file.

Preferably, the version upgrade software comprises a version file and a download file, and the first generating module 53 comprises a first generating sub-module 531 and a second generating sub-module 532. The structure thereof is described in detail hereinafter.

The first generating sub-module 531 is connected to the first encryption module 52 and is configured to generate the version file information corresponding to the version file encrypted by the first encryption module 52 in the version upgrade file, wherein the version file information comprises the decryption flag, and the decryption flag is configured to indicate that the encrypted version file is decrypted within the version upgrade software package during the process of upgrading the mobile terminal. The second generating sub-module 532 is connected to the first encryption module 52 and is configured to generate the download file information corresponding to the download file encrypted by the first encryption module 52 in the version upgrade file, wherein the download file information comprises a release flag, configured to indicate that the download file is saved in a hidden directory of a local computer during the process that the local computer upgrades the mobile terminal. The self-triggered unpacking program is further configured to save the download file in the hidden directory of the local computer during the process that the local computer upgrades the mobile terminal according to the release flag in the download file information. The download file is configured to upgrade the mobile terminal by using the version file and the version file information.

In the present preferred embodiment, the version file in the version upgrade software absolutely cannot be revealed to the users. Therefore the version file is decrypted only within the version upgrade software package during the process of upgrading the mobile terminal. Then the download file writes the decrypted version file into the mobile terminal to be upgraded. This solution can prevent certain users from acquiring the version file. Meanwhile, the download file in the version upgrade software comprises a main program and a plurality of auxiliary programs. The version upgrade of the mobile terminal equipment can be achieved by the collaborative work of these programs.

In the present preferred embodiment, the self-triggered unpacking program saves the download file in the hidden directory of the local computer and deletes the hidden directory and the download file together after the version upgrade software is completed. This solution can prevent certain users who have high professional operation knowledge from easily acquiring the file in the non hidden install directory, thereby improving the security of the software.

Meanwhile, the present preferred embodiment avoids decrypting the download file within the version upgrade software package. The download file which is decrypted within the version upgrade software package usually is saved in the memory of the local computer. The large amount of memory footprint may slow down the running of the local computer, and thus affect the version upgrade of the mobile terminal. Therefore the present preferred embodiment can reduce the influence on the version upgrade of the mobile terminal.

It needs to be noted that the apparatus for packing the version upgrade software package which is described in the apparatus embodiment corresponds to the above method embodiments. The specific implementation thereof is described in detail in the method embodiments, which will not be described here redundantly.

In summary, a method and an apparatus for packing a version upgrade software package is provided according to the above embodiments of the present invention. The present invention has fully considered that only the read operation is performed on the version file in the upgrading process, and no modification is needed for the version file. Hence, the download file (programs configured to write the version file into the mobile terminal) and the version file are distinguished by the file description information when packing. In addition, the simplicity for operating the software is considered. After the user starts the package software, it is green software without installation and it automatically releases the download file to the certain local hidden directory. The version file is not released and the download file directly reads the version file in the package file. This solution effectively avoids revealing the version file and guarantees the security of the software.

Obviously, those skilled in the art shall understand that the above modules and steps of the present invention can be realized by using general purpose calculating device, which can be integrated in one calculating device or distributed on a network which consists of a plurality of calculating devices. Alternatively, they can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the principle of the present invention.

What is claimed is:

1. A method for packing a version upgrade software package, comprising:
    acquiring version upgrade software for upgrading a mobile terminal;
    encrypting the version upgrade software;
    generating, by a hardware processor, version upgrade software information corresponding to the encrypted version upgrade software, wherein the version upgrade software information comprises a decryption flag, and the decryption flag is configured to indicate that the encrypted version upgrade software is decrypted within the version upgrade software package during a process of upgrading the mobile terminal; and
    packing to obtain the version upgrade software package of the mobile terminal, wherein the version upgrade software package comprises the encrypted version upgrade software, the version upgrade software information and a self-triggered unpacking program, and the self-triggered unpacking program is configured to start the version upgrade software and the version upgrade software information to upgrade the mobile terminal.

2. The method according to claim 1, wherein before packing to obtain the version upgrade software package of the mobile terminal, the method further comprises:
    generating a configuration file according to the version upgrade software, wherein the configuration file comprises a version number of the version upgrade software package; and
    generating configuration file information according to the configuration file, wherein the configuration file information comprises a size of the configuration file.

3. The method according to claim 2, wherein
    the version upgrade software package further comprises the configuration file and the configuration file information; and
    the self-triggered unpacking program is further configured to determine whether version number information contained in a name of the version upgrade software package is modified according to the configuration file and the configuration file information, and if result of the determination is yes, to prompt that version information is wrong.

4. The method according to claim 3, wherein the version upgrade software information further comprises:
    a name of the version upgrade software, a size of the version upgrade software and a relative path of the version upgrade software.

5. The method according to claim 3, wherein the version upgrade software package further comprise a trailer file, and the trailer file comprises a size of the self-triggered unpacking program, the number of the version upgrade software and constant information configured to locate the trailer file.

6. The method according to claim 2, wherein the version upgrade software information further comprises:
    a name of the version upgrade software, a size of the version upgrade software and a relative path of the version upgrade software.

7. The method according to claim 2, wherein the version upgrade software package further comprise a trailer file, and the trailer file comprises a size of the self-triggered unpacking program, the number of the version upgrade software and constant information configured to locate the trailer file.

8. The method according to claim 1, wherein the version upgrade software comprises a version file and a download file; and generating the version upgrade software information corresponding to the encrypted version upgrade software comprises:

generating version file information corresponding to an encrypted version file, wherein the version file information comprises the decryption flag, and the decryption flag is configured to indicate that the encrypted version file is decrypted within the version upgrade software package during the process of upgrading the mobile terminal; and generating download file information corresponding to the download file, wherein the download file information comprises a release flag, configured to indicate that the download file is saved in a hidden directory of a local computer during a process that the local computer upgrades the mobile terminal.

9. The method according to claim 8, wherein the self-triggered unpacking program is further configured to save the download file in the hidden directory of the local computer according to the release flag in the download file information during the process that the local computer upgrades the mobile terminal; and the download file is configured to upgrade the mobile terminal by using the version file and the version file information.

10. The method according to claim 9, wherein the version upgrade software information further comprises:

a name of the version upgrade software, a size of the version upgrade software and a relative path of the version upgrade software.

11. The method according to claim 9, wherein the version upgrade software package further comprise a trailer file, and the trailer file comprises a size of the self-triggered unpacking program, the number of the version upgrade software and constant information configured to locate the trailer file.

12. The method according to claim 8, wherein the version upgrade software information further comprises:

a name of the version upgrade software, a size of the version upgrade software and a relative path of the version upgrade software.

13. The method according to claim 8, wherein the version upgrade software package further comprise a trailer file, and the trailer file comprises a size of the self-triggered unpacking program, the number of the version upgrade software and constant information configured to locate the trailer file.

14. The method according to claim 1, wherein the version upgrade software information further comprises:

a name of the version upgrade software, a size of the version upgrade software and a relative path of the version upgrade software.

15. The method according to claim 1, wherein the version upgrade software package further comprise a trailer file, and the trailer file comprises a size of the self-triggered unpacking program, the number of the version upgrade software and constant information configured to locate the trailer file.

16. An apparatus for packing a version upgrade software package, comprising:

a first acquisition module, configured to acquire version upgrade software for upgrading a mobile terminal;

a first encryption module, configured to encrypt the version upgrade software;

a first generating module, configured to generate version upgrade software information corresponding to the encrypted version upgrade software, wherein the version upgrade software information comprises a decryption flag, and the decryption flag is configured to indicate that the encrypted version upgrade software is decrypted within the version upgrade software package during a process of upgrading the mobile terminal; and a packing module, configured to pack to obtain the version upgrade software package of the mobile terminal, wherein the version upgrade software package comprises the encrypted version upgrade software, the version upgrade software information and a self-triggered unpacking program, and the self-triggered unpacking program is configured to start the version upgrade software and the version upgrade software information to upgrade the mobile terminal;

a hardware processor, configured to execute the first acquisition module, the first encryption module, the first generating module, and the packing module.

17. The apparatus according to claim 16, further comprising:

a second generating module, configured to generate a configuration file according to the version upgrade software, wherein the configuration file comprises a version number of the version upgrade software package; and a third generating module, configured to generate configuration file information according to the configuration file, wherein the configuration file information comprises a size of the configuration file.

18. The apparatus according to claim 16, wherein the version upgrade software comprises a version file and a download file; and the first generating module comprises:

a first generating sub-module, configured to generate version file information corresponding to an encrypted version file, wherein the version file information comprises the decryption flag, and the decryption flag is configured to indicate that the encrypted version file is decrypted within the version upgrade software package during the process of upgrading the mobile terminal; and a second generating sub-module, configured to generate download file information corresponding to the download file, wherein the download file information comprises a release flag, configured to indicate that the download file is saved in a hidden directory of a local computer during a process that the local computer upgrades the mobile terminal.

* * * * *